United States Patent
Tanaka (10) Patent No.: US 11,570,785 B2
(45) Date of Patent: Jan. 31, 2023

(54) RADIO RESOURCE MANAGEMENT METHOD, MANAGEMENT APPARATUS, AND WIRELESS COMMUNICATION SYSTEM

(71) Applicant: FUJITSU LIMITED, Kawasaki (JP)

(72) Inventor: Yoshinori Tanaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/696,172

(22) Filed: Nov. 26, 2019

(65) Prior Publication Data
US 2020/0100259 A1 Mar. 26, 2020

Related U.S. Application Data (63) Continuation of application No. PCT/JP2017/020267, filed on May 31, 2017.

(51) Int. Cl.
*H04W 72/08* (2009.01)
*H04W 72/04* (2009.01)

(52) U.S. Cl.
CPC ..... *H04W 72/085* (2013.01); *H04W 72/0453* (2013.01)

(58) Field of Classification Search
CPC ............. H04W 16/14; H04W 72/0453; H04W 72/085
See application file for complete search history.

(56) References Cited

U.S. PATENT DOCUMENTS

| | | | |
|---|---|---|---|
| 2008/0200195 A1* | 8/2008 | Abe | H04W 16/14 455/501 |
| 2008/0221951 A1 | 9/2008 | Stanforth et al. | |
| 2008/0222019 A1 | 9/2008 | Stanforth et al. | |
| 2008/0222020 A1 | 9/2008 | Stanforth et al. | |
| 2008/0222021 A1 | 9/2008 | Stanforth et al. | |
| 2010/0135214 A1* | 6/2010 | Ishizu | H04W 48/18 370/328 |

(Continued)

FOREIGN PATENT DOCUMENTS

| | | |
|---|---|---|
| JP | 2005-102260 A | 4/2005 |
| JP | 2005-167945 A | 6/2005 |

(Continued)

OTHER PUBLICATIONS

International Search Report, issued by International Searching Authority in corresponding International Application No. PCT/JP2017/020267, dated Sep. 5, 2017, (PCT/ISA/210).

(Continued)

*Primary Examiner* — Ankur Jain
(74) *Attorney, Agent, or Firm* — ArentFox Schiff LLP (57) ABSTRACT

A radio resource management method in a management apparatus for managing a wireless network including radio resources provided by owners, the radio resource management method includes, managing radio resource information about the radio resources, acquiring, from a terminal device which uses the radio resources for communication, communication conditions representing conditions in the communication, and controlling the radio resources used by the terminal device for communication on the basis of the radio resource information and the communication conditions.

13 Claims, 10 Drawing Sheets

(56) References Cited

U.S. PATENT DOCUMENTS

| | | | |
|---|---|---|---|
| 2010/0248638 A1* | 9/2010 | Harada | H04J 11/0053 455/67.11 |
| 2011/0055070 A1 | 3/2011 | Stanforth et al. | |
| 2011/0176433 A1* | 7/2011 | Monogioudis | H04L 47/822 370/252 |
| 2011/0231302 A1 | 9/2011 | Stanforth et al. | |
| 2012/0142382 A1 | 6/2012 | Stanforth et al. | |
| 2013/0070688 A1* | 3/2013 | Picker | H04B 7/0689 370/329 |
| 2013/0260777 A1* | 10/2013 | Gormley | H04W 72/0473 455/452.1 |
| 2015/0011183 A1 | 1/2015 | Sawai | |
| 2015/0163659 A1* | 6/2015 | Tuli | H04W 48/16 370/328 |

FOREIGN PATENT DOCUMENTS

| | | |
|---|---|---|
| JP | 2005167945 A * | 6/2005 |
| JP | 2005-293062 A | 10/2005 |
| JP | 2010-135947 A | 6/2010 |
| JP | 2010-521105 A | 6/2010 |
| JP | 2016-208179 A | 12/2016 |
| WO | WO-94/28683 A1 | 12/1994 |
| WO | WO-2003/049404 A1 | 6/2003 |
| WO | WO-2008/109641 A2 | 9/2008 |
| WO | WO-2013/132901 A1 | 9/2013 |

OTHER PUBLICATIONS

Written Opinion, issued by International Searching Authority in corresponding International Application No. PCT/JP2017/020267, dated Sep. 5, 2017, (PCT/ISA/237).

Decision of Refusal from the Japanese Patent Office in counterpart application No. 2019-521599, dated Sep. 14, 2021.

Japanese Office Action issued in corresponding Japanese patent application No. 2019-521599, dated Mar. 2, 2021.

Communication from the State Intellectual Property Office of People's Republic of China in Application No. 201780091336.5, dated Aug. 29, 2022.

* cited by examiner

FIG. 2

| RADIO RESOURCE, SERVICES |
|---|
| SPECTRUM |
| RAN APPARATUS |
| MBH/MFH |
| SITE INSTALLATION PLACE |
| CN NODE vEPC |
| MEC SERVER |
| LOCAL/MEC SERVICE |
| CLOUD SERVICE |
| MAINTENANCE/ENGINEERING |
| POWER CONSUMPTION |
| QUALITY (QoS/QoE) |

RADIO RESOURCE MANAGEMENT METHOD, MANAGEMENT APPARATUS, AND WIRELESS COMMUNICATION SYSTEM

CROSS-REFERENCE TO RELATED APPLICATION

This application is a continuation application of International Application Number PCT/JP2017/020267 filed on May 31, 2017 and designated the U.S., the entire contents of which are incorporated herein by reference.

FIELD

The present invention relates to a radio resource management method, a management apparatus, and a wireless communication system.

BACKGROUND

In wireless communication systems, communication traffic tends to increase due to increases in the amount of communication according to mobile terminals (smartphones, feature phones, and the like) and increase in the number of Internet of things (IoT) devices. Communication carriers need to install additional radio resources (radio access networks (RANs)) such as base station devices in order to cope with communication traffic increases. However, installation of additional radio resources incurs expenses for securing appropriate installation places, construction of new machinery and networks, and the like, for example.

Accordingly, business development in which radio resources are separated from a core network is conceived. For example, an individual or a business operator (also referred to as an owner) provides (lends) radio resources such as base station devices to a core network operator. Accordingly, the core network operator need not install radio resources and thus can reduce costs.

Technologies with respect to wireless networks are disclosed in Patent Literature 1 and 2 below.

CITATION LIST

Patent Literature

Patent Literature 1: Japanese Patent Application Publication No. 2005-293062
Patent Literature 2: Japanese Patent Application Publication No. 2005-102260

SUMMARY

A radio resource management method in a management apparatus for managing a wireless network including radio resources provided by owners, the radio resource management method includes, managing radio resource information about the radio resources, acquiring, from a terminal device which uses the radio resources for communication, communication conditions representing conditions in the communication, and controlling the radio resources used by the terminal device for communication on the basis of the radio resource information and the communication conditions.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described in detail below with reference to the figures. Problems and embodiments described in the present specification are examples, and do not limit the scope of rights of the present application. More particularly, even if expressions used in the description vary, as long as the various expressions mean technically the same matters, the technology of the present application can be applied on the basis of these different expressions without limiting the scope of rights.

When a certain base station device uses radio waves without considering radio waves transmitted from other base station devices, for example, there are cases in which radio waves interfere with each other. In addition, there are cases in which a throughput and a data transmission amount needed for a terminal device to be connected are not satisfied depending on the communication performance of a base station device.

First Embodiment

First, a first embodiment will be described.

Example of Configuration of Wireless Communication System

Figure 1:
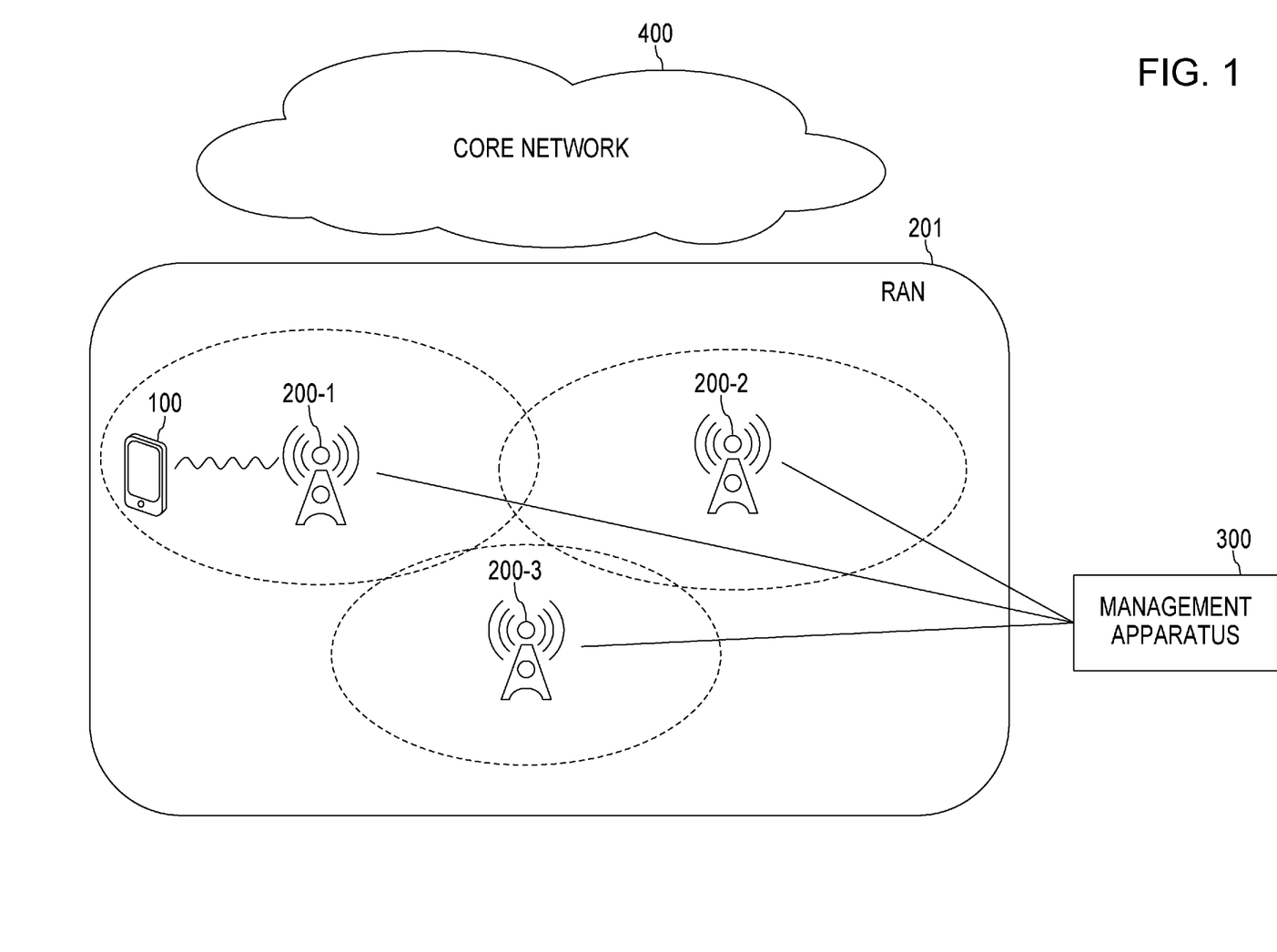
FIG. 1 is a diagram illustrating an example of a configuration of a wireless communication system 10.

FIG. 1 is a diagram illustrating an example of a configuration of a wireless communication system 10. The wireless communication system 10 includes a terminal device 100, base station devices 200-1 to 200-3, a management apparatus 300, and a core network 400. The wireless communication system 10 is, for example, a communication system corresponding to the Long Term Evolution (LTE) communication standard.

The terminal device 100 is, for example, a wireless communication device such as a mobile terminal or a computer with a communication function. The terminal device 100 is wirelessly connected to, for example, the base station device 200 and performs communication with a communication device connected to the core network 400 through the base station device 200. The terminal device 100 downloads data and is provided with services from the base station device 200 and the core network 400.

The base station devices 200-1 to 200-3 (which may hereinafter be referred to as a base station device 200) are wireless communication devices which relay packets transmitted and received by the terminal device 100. The base station device 200 is, for example, a base station device such as an evolved Node B (eNodeB) in LTE. In addition, the base station devices 200-1 to 200-3 constitute a RAN 201.

For example, the core network 400 may be the Internet or an intranet composed of dedicated lines.

The management apparatus 300 is an apparatus which manages and controls radio resources in the RAN 201 and is, for example, a computer such as a server machine. Radio resources are, for example, the base station device 200, frequency bands of radio waves transmitted and received by the base station device 200, and resource blocks.

In addition, in the wireless communication system 10, the base station devices 200-1 to 200-3 are devices borrowed from the owners thereof. The RAN 201 is an assembly of radio resources borrowed (provided) from the owners thereof. Meanwhile, although borrowed radio resources are the base station device 200 in the first embodiment, the borrowed radio resources may be services provided to other radio resources, a part of the base station device 200 or the terminal device 100, for example.

Figure 2:
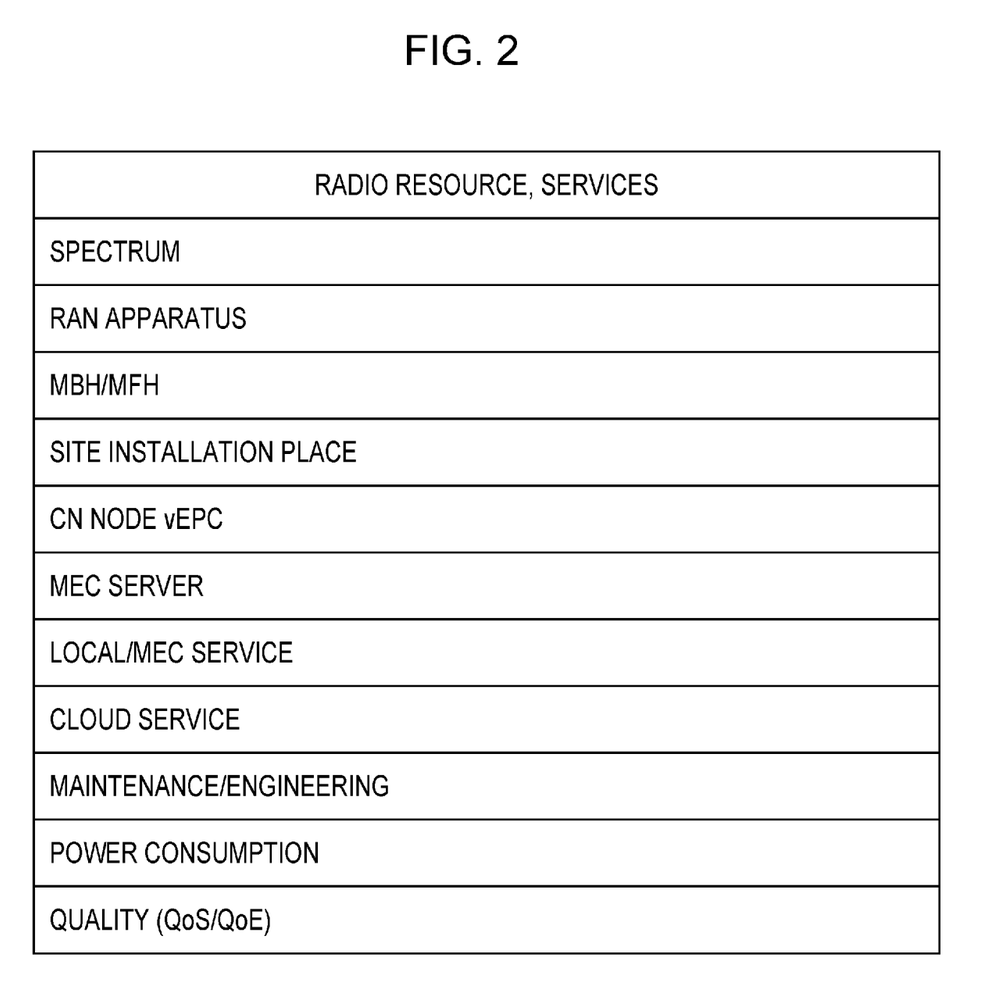
FIG. 2 is a diagram illustrating an example of radio resources and services.

FIG. 2 is a diagram illustrating an example of radio resources and services. Radio resources include services (e.g., "quality" and the like which will be described later) provided to the terminal device 100 and services (e.g., "maintenance/engineering", "power consumption", "site installation places" and the like which will be described later) provided to other radio resources in addition to devices and lines which constitute the RAN 201.

"Spectrum" is, for example, a frequency band, a right to use each frequency band (license), or the like. "RAN apparatus" is, for example, a device which constitutes a RAN such as a base station device, a central unit (CU), a distributed unit (DU) or an antenna. "Mobile front haul/mobile back haul (MBH/MFH)" is, for example, a back haul line or a front haul line. "Site installation place" is, for example, a usage fee of an installation place of the aforementioned RAN apparatus. "Core network (CN) node virtualized evolved packet core (vEPC)" is, for example, a vEPC node obtained by virtualizing a core network node, a serving gateway (S-GW) or a mobility management entity (MME). "Mobile edge computing (MEC) server" is, for example, a server in which an edge such as an MEC server is mounted. "Local/MEC service" is, for example, a service of providing an edge to the terminal device 100. "Cloud service" is, for example, a service of providing services realized on a cloud server to the terminal device 100. "Maintenance/engineering" is, for example, a service of providing maintenance and technical support for radio resources. "Power consumption" is, for example, power supply to other radio resources.

"Quality (quality of service (QoS)/quality of experience (QoE))" is, for example, QoS and QoE provided to the terminal device 100.

The management apparatus 300 manages and controls provided radio resources (the base station devices 200-1 to 200-3) in the RAN 201 and determines prices to be paid to owners of the radio resources in response to amounts of usage of the provided radio resources.

Meanwhile, in the first embodiment, a manager of the management apparatus 300 does not manage the core network 400. However, the manager may also manage the core network 400 as one radio source.

Example of Configuration of Management Apparatus

Figure 3:
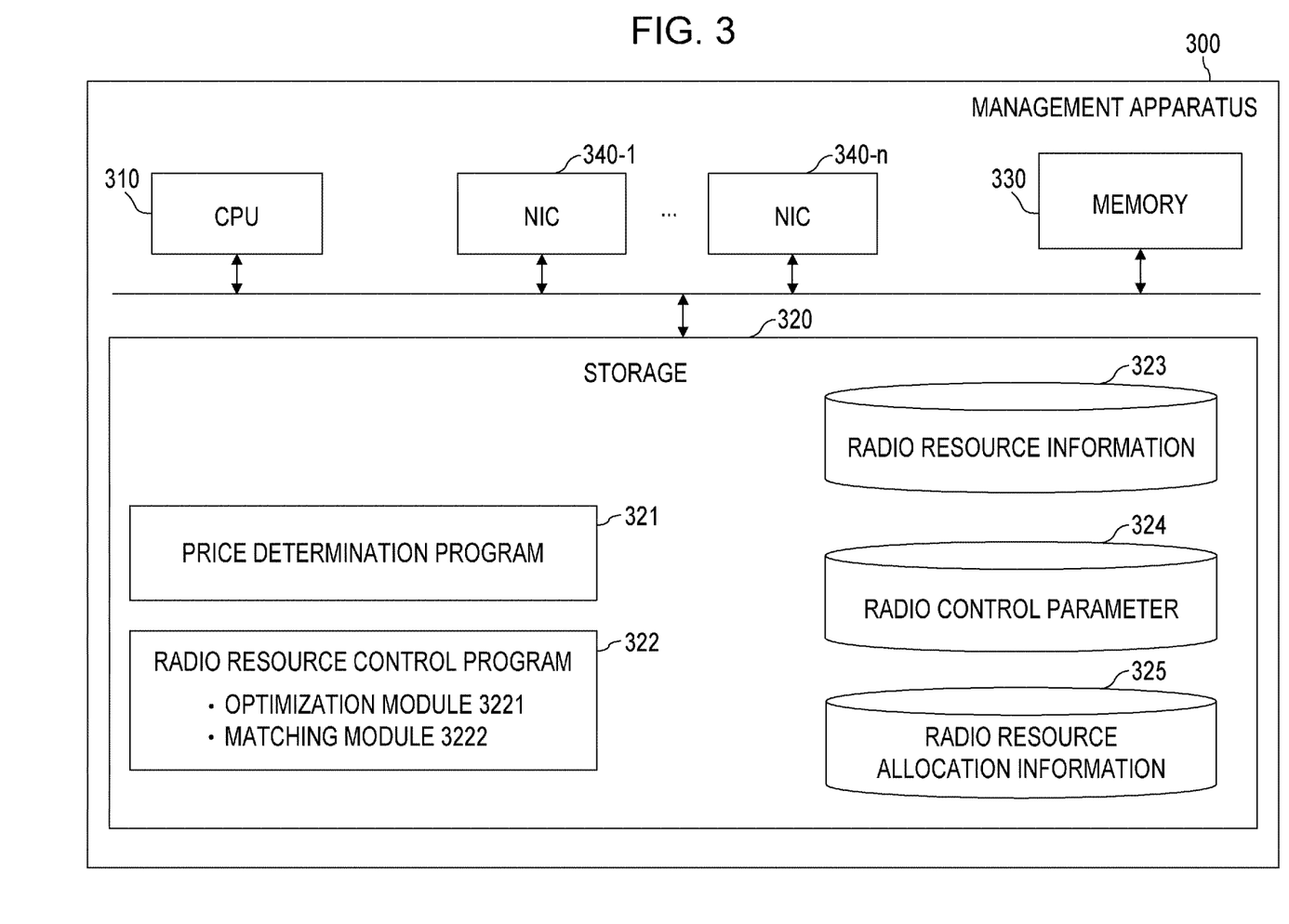
FIG. 3 is a diagram illustrating an example of a configuration of the management apparatus 300.

FIG. 3 is a diagram illustrating an example of a configuration of the management apparatus 300. The management apparatus 300 includes a central processing unit (CPU) 310, a storage 320, a memory 330 such as a dynamic random access memory (DRAM), and network interface cards (NICs) 340-1 to 340-n.

The storage 320 is a subsidiary storage device which stores programs and data, such as a flash memory, a hard disk drive (HDD) or a solid state drive (SSD). The storage 320 stores a price determination program 321, a radio resource control program 322, radio resource information 323, a radio control parameter 324, and radio resource allocation information 325.

The radio resource information 323 is information about radio resources and services used by the terminal device 100.

For example, when the base station device 200 is provided (borrowed) from the owner thereof as a radio resource, the radio resource information 323 is a table storing information about the communication performance of the base station device 200 such as a range of transmission outputs of the base station device 200, transmittable frequency bands, and the number of available channels. In addition, the radio resource information may include provision conditions (e.g., a provision time, a provision place, the amount of communication data, and the like) set by the owner of the base station device 200.

The radio control parameter 324 is a table storing a radio control parameter designated by the management apparatus 300 for each base station device 200. For example, the radio control parameter may be a parameter for controlling a radio resource such as transmission power (transmission output), a transmission frequency band and a transmittable time period.

The radio resource allocation information 325 is, for example, information about allocation of radio resources in communication between the terminal device 100 and the base station device 200. The information about allocation of radio resources is, for example, an identifier of the base station device 200 which can communicate with the terminal device 100, QoS which can be provided by each base station device 200 to the terminal device 100, and a transmission rate. In addition, the information about allocation of radio resources may include information about charges (prices) such as a usage fee per unit data (or unit time) of the base station device 200, for example.

The memory 330 is a region in which a program stored in the storage 320 is loaded. In addition, the memory 330 is also used as a region in which a program stores data.

The NICs 340-1 to 340-n (which may be called an NIC 340 below) are network interfaces connected to the base station device 200 of the RAN 201. The management apparatus 300 controls the base station device 200 through the NIC 340.

The CPU 310 is a processor which loads a program stored in the storage 320 to the memory 330, executes the loaded program and realizes each processing.

The CPU 310 constructs a determination unit and performs price determination processing by executing the price determination program 321. The price determination processing is processing of acquiring usage records (use records) including the amounts of usage of radio resources from respective radio resources (e.g., the base station devices 200-1 to 200-3) and determining prices (charges) depending on the amounts of usage.

In addition, the CPU 310 constructs a control unit, a communication condition acquisition unit, a radio resource information management unit and a communication state acquisition unit and performs radio resource control processing by executing the radio resource control program 322. The radio resource control processing is processing of determining radio control parameters and controlling radio resources on the basis of radio resource information and communication conditions. The radio resource information is, for example, information about the performance (a transmission output width, a frequency bandwidth, and the like) of a provided radio resource. Further, the communication conditions are, for example, conditions (a communication speed, the amount of communication data, and the like) necessary for communication of the terminal device 100. A communication state is, for example, usages of radio resources (a processing load rate, the number of connected terminal devices, the number of channels that can be allocated, and the like) and a degree of interference of signals transmitted and received by radio resources. The radio control parameters are, for example, parameters (a transmission output, a transmission frequency band and the like) of a radio resource.

In addition, the CPU 310 performs optimization processing by executing an optimization module 3221 included in the radio resource control program 322. The optimization processing is, for example, processing of determining a transmission output or a frequency band in which interference between base station devices (between cells) is optimized (e.g., a numerical value by which average interference is lowest).

Further, the CPU 310 performs matching processing by executing a matching module 3222 included in the radio resource control program 322. The matching processing is, for example, processing of allocating a radio resource which satisfies communication conditions of the terminal device 100 to the terminal device 100.

Radio Resource Allocation Processing

Figure 4:
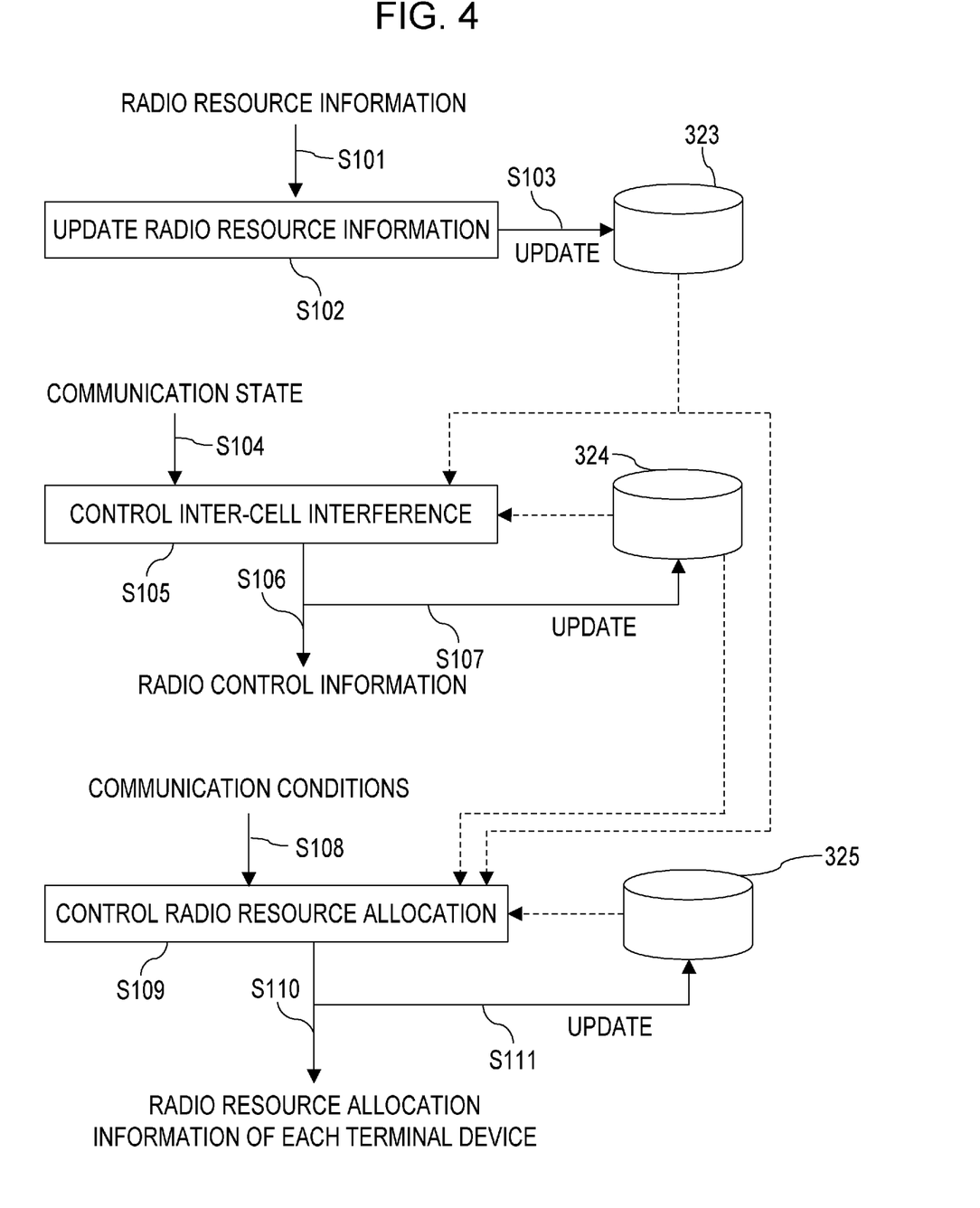
FIG. 4 is a diagram illustrating an example of radio resource allocation processing in the wireless communication system 10.

FIG. 4 is a diagram illustrating an example of radio resource allocation processing in the wireless communication system 10. The radio resource allocation processing is, for example, a part of the radio resource control processing in the management apparatus 300. Dotted-line arrows in the figure indicate that the management apparatus 300 refers to information of sources of arrows in processing at destinations of the arrows.

The management apparatus 300 acquires radio resource information (S101). For example, the radio resource information may be presented by owners of radio resources or acquired from the radio resources. When the radio resource information is acquired, the management apparatus 300 updates the radio resource information 323 (S102 and S103).

The management apparatus 300 performs inter-cell interference control (S105) when a communication state is acquired (S104). The communication state is acquired, for example, by receiving a message transmitted from each radio resource (base station device 200). Inter-cell interference control processing is, for example, one type of optimization processing. The management apparatus 300 performs inter-cell interference control on the basis of (with reference to) the acquired communication state, the radio resource information 323, and a current radio control parameter 324. The inter-cell interference control is, for example, processing of determining a transmission output or a transmission frequency band in which an average value of interference between base station devices 200 is lowest. The management apparatus 300 executes inter-cell interference control, determines a radio control parameter (S106) and updates the radio control parameter 324 (S107).

Next, the management apparatus 300 performs radio resource allocation control (S109) when communication conditions are acquired (S108). Radio resource allocation control processing is, for example, one type of matching processing. The management apparatus 300 receives, for example, a message transmitted from the terminal device 100 and acquires communication conditions. The management apparatus 300 allocates a radio resource which satisfies the communication conditions to the terminal device 100 on the basis of (with reference to) the radio resource information 323, the radio control parameter 324 and current radio resource allocation information 325 in the radio resource allocation control processing. The management apparatus 300 allocates a radio resource to each terminal device (S110) and updates the radio resource allocation information 325 (S111).

In FIG. 4, inter-cell interference control and radio resource allocation control form a closed loop through, for example, an interference signal level included in the communication conditions.

Figure 5:
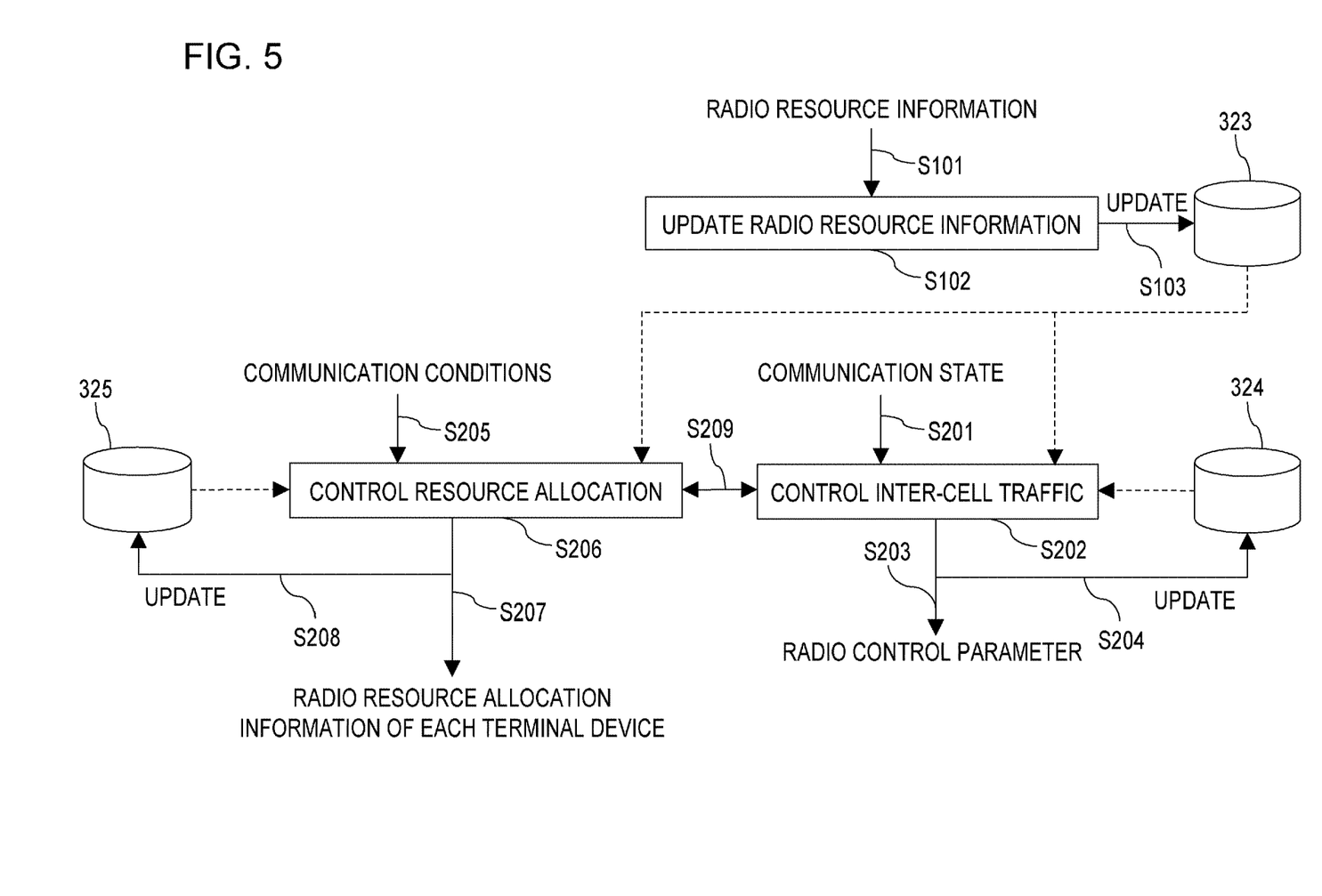
FIG. 5 is a diagram illustrating an example of radio resource allocation processing in the wireless communication system 10.

FIG. 5 is a diagram illustrating an example of radio resource allocation processing in the wireless communication system 10. Processing S101 to processing S103 are the same as processing S101 to processing S103 of FIG. 4.

The management apparatus 300 performs inter-cell traffic control (S202) when a communication state is acquired (S201). Inter-cell traffic control processing is, for example, one type of optimization processing. The management apparatus 300 performs the inter-cell traffic control on the basis of (with reference to) the acquired communication state, the radio resource information 323 and the current radio control parameter 324. The inter-cell traffic control is, for example, processing of determining a base station device 200 to which the terminal device 100 will be wirelessly connected such that traffic between base station devices 200 is uniform or approximately uniform. The management apparatus 300 executes the inter-cell traffic control, determines a radio control parameter (S203) and updates the radio control parameter 324 (S204).

On the other hand, the management apparatus 300 performs radio resource allocation control (S206) when communication conditions are acquired (S205). Radio resource allocation control processing is, for example, one type of matching processing. The management apparatus 300 allocates a radio resource which satisfies the communication conditions to the terminal device 100 on the basis of (with reference to) the radio resource information 323, the radio control parameter 324 and the current radio resource allocation information 325 in the radio resource allocation control processing. The management apparatus 300 allocates a radio resource to each terminal device (S206) and updates the radio resource allocation information 325 (S207).

Meanwhile, for example, the management apparatus 300 executes inter-cell traffic control and radio resource allocation control in parallel in cooperation (S209) in FIG. 5.

In the first embodiment, the management apparatus 300 allocates a radio resource to be used by a terminal device for communication on the basis of radio resource information and communication conditions. In addition, each base station device 200 wirelessly communicates with the terminal device 100 through the radio resource and radio control parameters determined by the management apparatus 300. Accordingly, the management apparatus 300 can allocate a radio resource to the terminal device 100 in consideration of a degree of interference and the amount of traffic of the entire wireless communication system 10.

Second Embodiment

Next, a second embodiment will be described. In the wireless communication system 10 of the second embodiment, the management apparatus 300 does not manage the core network (CN) 400. For example, the operator (owner) of the core network 400 makes a contract for using the RAN 201 with the manager of the management apparatus 300 and uses the RAN 201.

RAN License Defrayment Processing

Figure 6:
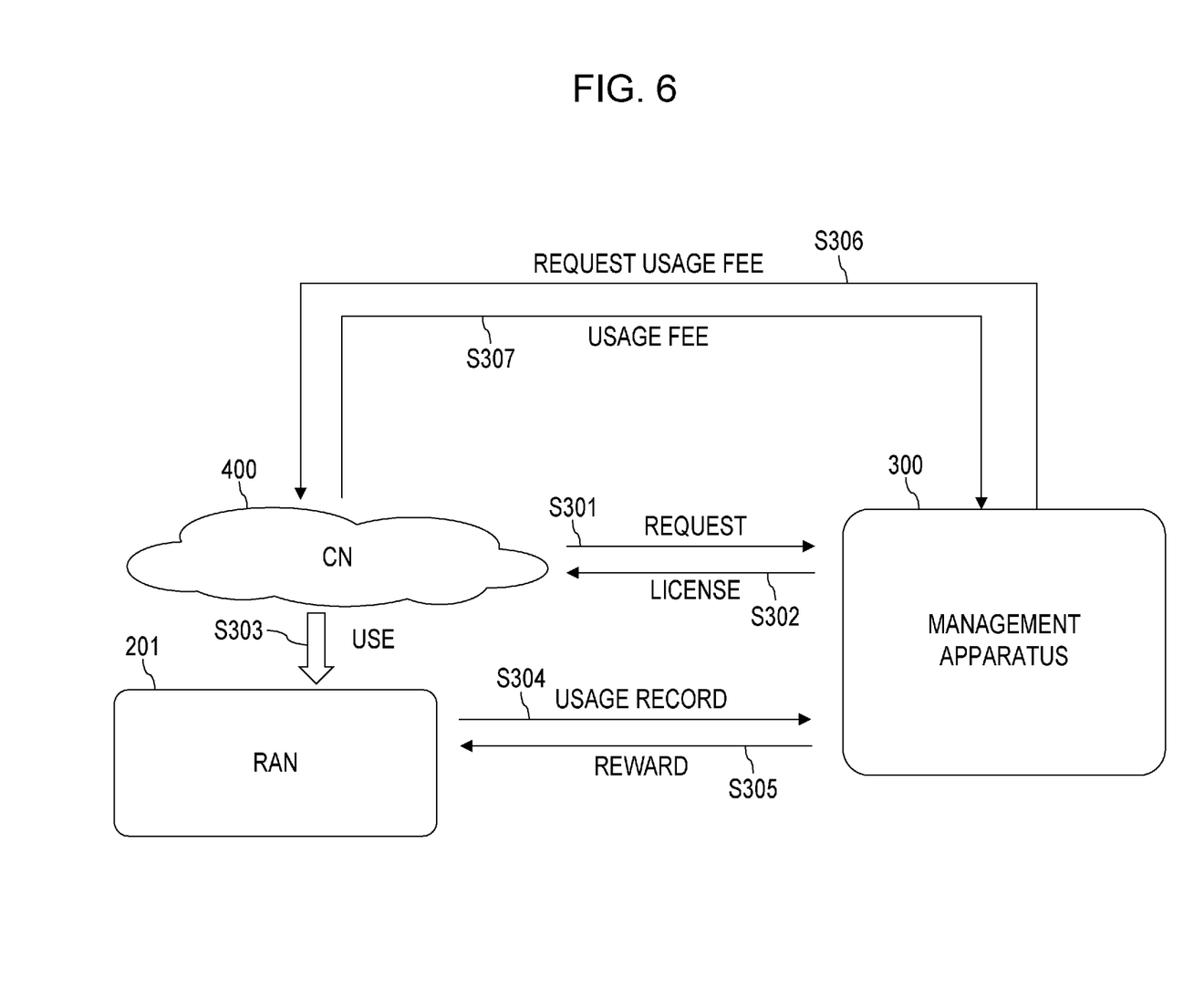
FIG. 6 is a diagram illustrating an example of RAN license defrayment processing.

FIG. 6 is a diagram illustrating an example of RAN license defrayment processing. The operator of the core network 400 makes a contract for using the RAN 201 with the manager of the management apparatus 300, for example. The management apparatus 300 manages radio resources available for the core network 400 in the RAN 201.

When the core network 400 uses the RAN 201, for example, the core network 400 transmits a request to the management apparatus 300 (S301). The request includes, for example, information about communication conditions such as a communication place (an installation place of the base station device 200), time of use, the amount of communication data and a communication speed, and information about the contract such as an operator number of the operator of the core network 400 and a contract number.

When the request is received, the management apparatus 300 allocates a radio resource matching the request to the core network 400, transmits the license of the allocated radio resource to the core network 400 and permits the core network 400 to use the allocated radio resource.

The core network 400 uses the radio resource whose license has been acquired (S303) to perform communication.

The RAN 201 notifies the management apparatus 300 of the amount of usage (e.g., the amount of communication data, a communication time, the number of wireless connections, and the like) of the radio resource used by the core network 400 for communication as a usage record (S304). For example, the usage record may be regularly acquired such as monthly or may be acquired at a timing at which the amount of usage exceeds a specific amount of usage.

The management apparatus 300 determines a price for the amount of usage when the usage record is acquired. Then, the manager of the management apparatus 300 pays the determined price, for example, to the owner of the radio resource (S305).

Further, when the usage record is acquired, the management apparatus 300 (or the manager of the management apparatus 300) charges the core network 400 (or the operator of the core network 400) a fee (usage fee) in response to the amount of usage of the usage record (S306). The operator of the core network 400 pays the usage fee to the manager of the management apparatus 300 (S307).

In the second embodiment, the manager of the management apparatus 300 acquires a price for using a radio resource of the RAN 201 from the core network operator and pays the price for using the radio resource to the radio resource owner (provider). Accordingly, the core network operator can use the RAN 201 by making a contact only with the manager of the management apparatus 300 without individually making a contract with each radio resource owner of the RAN 201, for example. Further, the core network operator uses the RAN 201 and thus can reduce installation costs for preparation of a RAN environment.

Third Embodiment

Next, a third embodiment will be described. In the wireless communication system 10 of the third embodiment, the user of the terminal device 100 makes a contract for using the RAN 201 with the manager of the management apparatus 300 or performs a license purchase procedure. In addition, the user of the terminal device 100 prepays a usage fee to the manager of the management apparatus 300 in the contract or license purchase procedure. The user of the terminal device 100 uses a radio resource of the RAN 201 having the amount of usage depending on the prepaid usage fee as a limit.

Token Defrayment Processing

Figure 7:
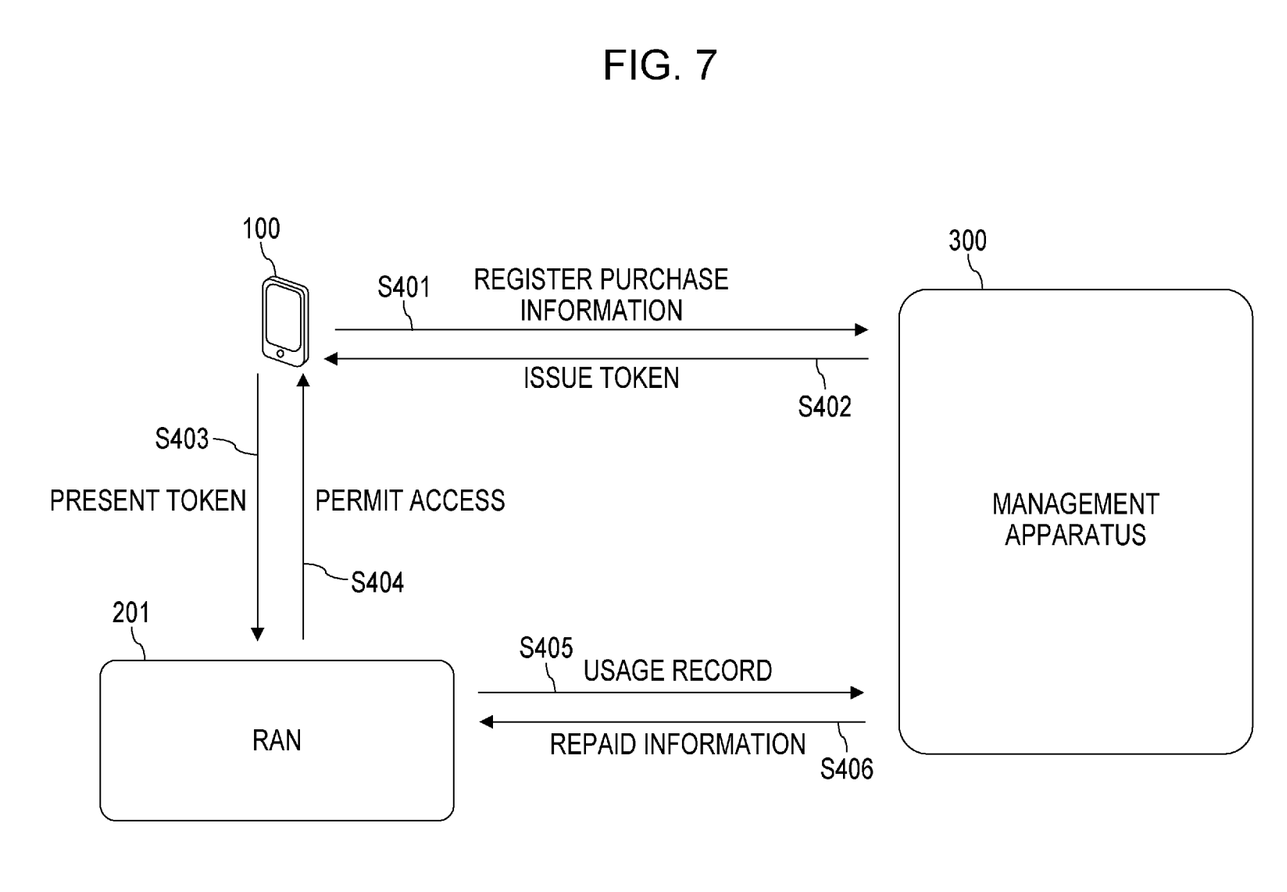
FIG. 7 is a diagram illustrating an example of token defrayment processing.

FIG. 7 is a diagram illustrating an example of token defrayment processing. The user (owner) of the terminal device 100 makes a contract for using the RAN 201 with, for example, the manager of the management apparatus 300. Then, the user of the terminal device 100 prepays a predetermined amount.

The terminal device 100 performs purchase information registration for the management apparatus 300 (S401). Alternatively, the management apparatus 300 may perform purchase information registration when the management apparatus 300 makes a contract with the user of the terminal device 100 or during the license purchase procedure. Purchase information registration is, for example, processing of registering, in the management apparatus 300, the identifier of the terminal device 100, reception of the prepaid usage fee by the manager of the management apparatus 300, or an upper limit value of the amount of usage depending on the prepaid usage fee and the like.

The management apparatus 300 issues a token to the terminal device 100 (or the user) when purchase information registration has been performed (S402). The token indicates that acquisition and authentication of the license of the terminal device 100 or the user thereof is completed and includes, for example, a one-time password or the like.

When the terminal device 100 uses the RAN 201, the terminal device 100 presents the acquired token to the base station device 200 (radio resource) of the RAN 201. The base station device 200 checks the token and permits access of the terminal device 100 (S404).

The RAN 201 transmits a usage record of the terminal device 100 to the management apparatus 300, for example, regularly (S405). The management apparatus 300 checks the usage record and records the remaining amount of usage of the prepaid usage fee. In addition, when the amount of usage of the radio resource of the terminal device 100 exceeds the amount of usage depending on the prepaid usage fee, for example, the management apparatus 300 invalidates the token of the terminal device 100 and notifies the RAN 201 that the token has been invalidated. That is, the terminal device 100 can use the radio resource within the range of the prepaid usage fee.

In the third embodiment, the terminal device 100 can use the RAN 201 depending on a prepaid amount. Accordingly, the terminal device 100 can perform communication within the limit of the prepaid amount without being charged for an amount more than expected by the management apparatus 300.

Fourth Embodiment

Next, a fourth embodiment will be described. In the wireless communication system 10 of the fourth embodiment, the management apparatus 300 acquires permissions to use frequency bands from a plurality of licensors and accumulates the same in frequency pools. Then, the management apparatus 300 gives a frequency license in response to a request from the RAN 201.

Frequency License Defrayment Processing

Figure 8:
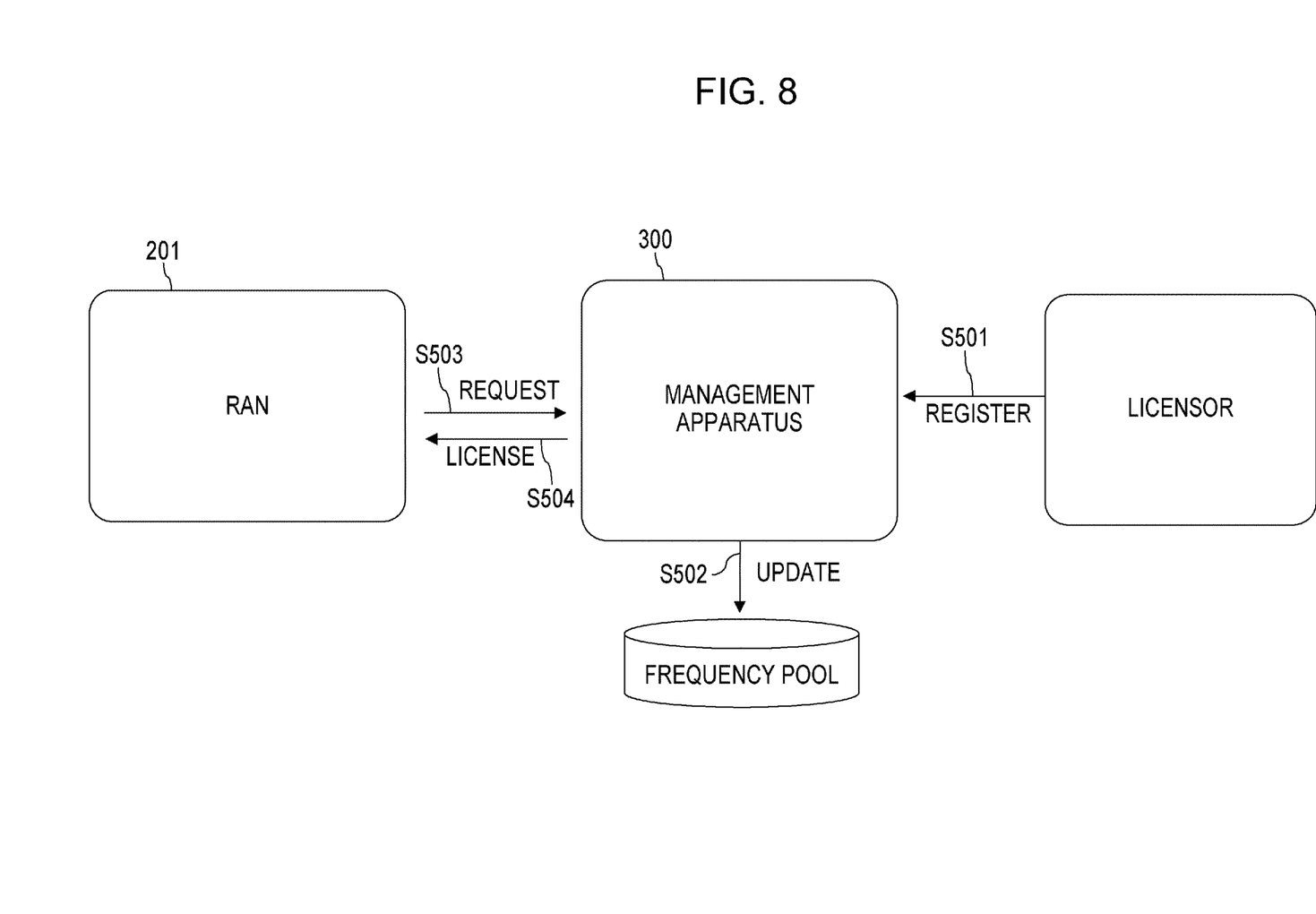
FIG. 8 is a diagram illustrating an example of frequency license defrayment processing.

FIG. 8 is a diagram illustrating an example of frequency license defrayment processing. The management apparatus 300 makes a contract with an authorized licensor (having a license) who is permitted to use a specific frequency, for example, and registers a permission to use a specific frequency having a license (S501). In addition, the management apparatus 300 registers (updates) the specific frequency in frequency pools as a frequency available for the RAN 201 (S502). Meanwhile, a licensor may limit a time and a place at which/in which a frequency band permitted to be used is used, for example. In this case, restrictions are also stored in frequency pools.

When the RAN 201 transmits radio waves, for example, the RAN 201 transmits a request for defrayment for the license of a transmittable frequency to the management apparatus 300 (S503). The request includes, for example, a request for information of a time desired to be used, a frequency desired to be used, and a vacant channel (a frequency band which is not used), and the like. The management apparatus 300 determines some or all frequency bands of frequencies accumulated in frequency pools to be frequencies available for the RAN 201 and transmits (issues) a license including information about frequency bands available for the RAN 201 to the RAN 201 (S504). Meanwhile, when the management apparatus 300 issues the license, the management apparatus 300 allocates frequency bands to each radio resource such that radio signals in the RAN 201 do not interfere with each other or a degree of interference decreases.

The management apparatus 300 acquired, from the RAN 201, a usage record including the amount of usage (e.g., the number of times of usage, a time used, the number of used terminal devices, etc.) for each frequency band, for example. The management apparatus 300 determines a price to be charged for the licensor of each frequency band in response to the amount of usage. The manager of the management apparatus 300 pays the determined price to each licensor.

In the fourth embodiment, the management apparatus 300 manages available frequency bands through frequency pools. Accordingly, the management apparatus 300 can collectively manage frequency bands and perform allocation of frequency bands in consideration of a degree of interference of the entire RAN 201.

Fifth Embodiment

Next, a fifth embodiment will be described. In the fifth embodiment, a plurality of owners (users) jointly invest in a certain radio resource. Then, the plurality of owners are paid in response to investment ratios.

Price Determination Processing

Figure 9:
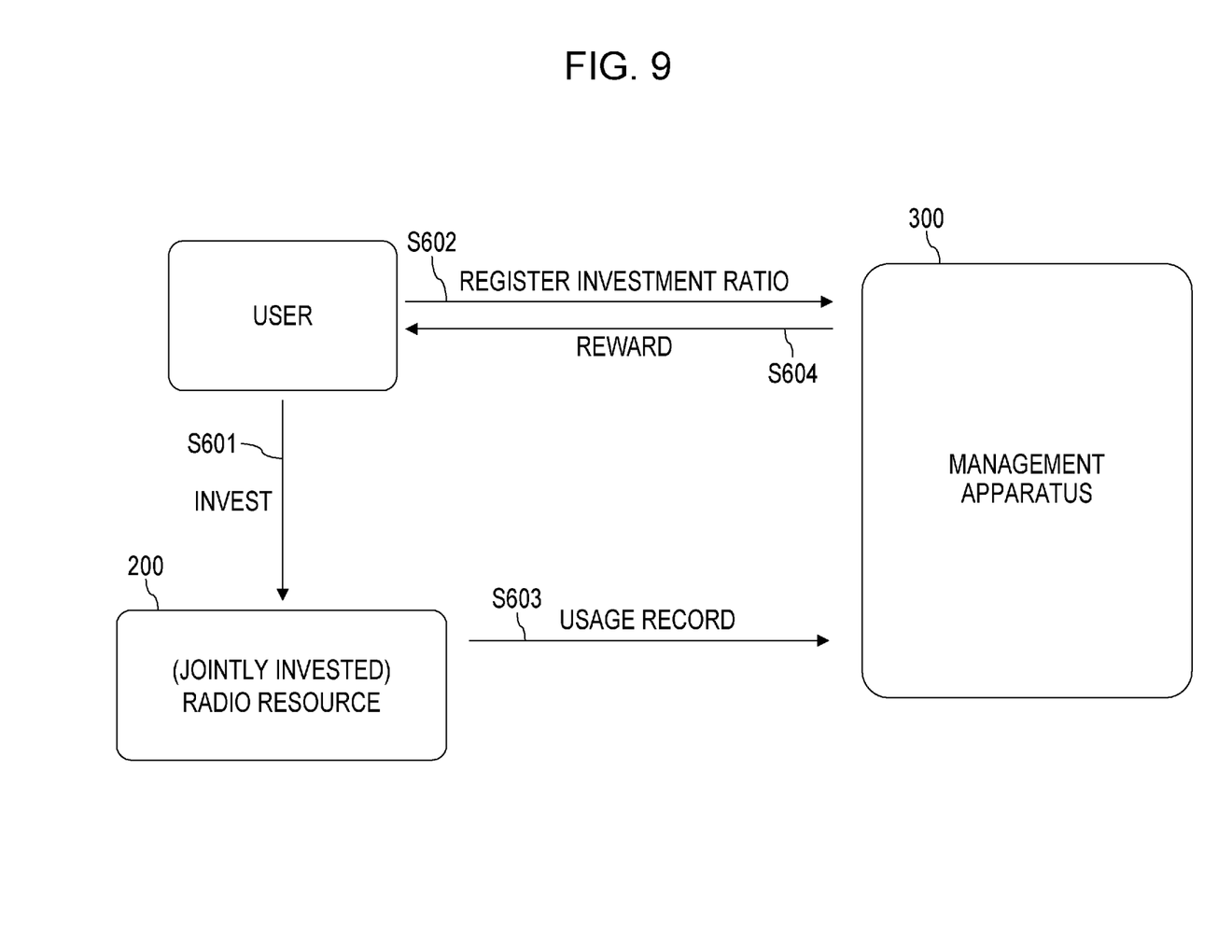
FIG. 9 is a diagram illustrating an example of price determination processing.

FIG. 9 is a diagram illustrating an example of price determination processing. A plurality of users (owners) jointly invest in a certain radio resource (S601).

The radio resource that is a joint investment target is, for example, a base station device. For example, the manager of the management apparatus 300 recruits investors for the base station device. Then, users collected through recruitment respectively determine amounts to be invested and invest in the base station device. The users are paid in response to investment amounts.

In addition, the radio resource that is the joint investment target may be a frequency. For example, there is a case in which a competent authority of a certain country sells (leases) a license of a predetermined frequency band through an auction. In an action, a license is given to, for example, a user who presents a highest amount. In this case, the manager of the management apparatus 300 recruits a plurality of joint investors in order to collect investments for license acquisition, for example. When the license is acquired through joint investment, users are paid in response to investment amounts.

Then, the plurality of users register investment ratios for the jointly invested radio resource (referred to as a joint investment radio resource) in the management apparatus 300 (S602).

The RAN 201 transmits a usage record of the joint investment radio resource to the management apparatus 300 (S603). The management apparatus 300 determines a numeral value obtained by multiplying a price in response to a usage record by an investment ratio of joint investment as a price for each user. Then, the manager of the management apparatus 300 pays the price determined for each user to each user as a reward (S604).

In the fifth embodiment, the RAN 201 has the jointly invested radio resource. The management apparatus 300 manages investment ratios for the jointly invested radio resource. Accordingly, the manager of the management apparatus 300 can pay prices in response to the investment ratios to joint investors.

Sixth Embodiment

Next, a sixth embodiment will be described. In the sixth embodiment, processing of a control system such as the radio resource allocation processing executed in the first embodiment, for example, is executed using a distributed network.

Figure 10:
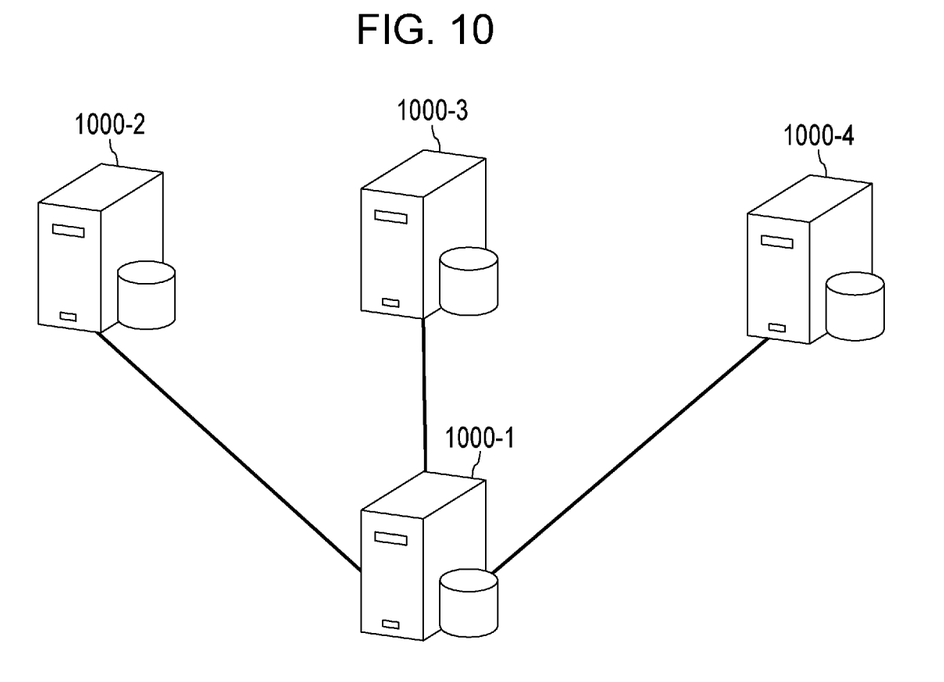
FIG. 10 is a diagram illustrating an example of a distributed network. The distributed network includes computers 1000-1 to 1000-4.

FIG. 10 is a diagram illustrating an example of a distributed network. The distributed network includes computers 1000-1 to 1000-4. The computers 1000-1 to 1000-4 may be CPUs or virtualized computers, for example. For example, a computer (e.g., the computer 1000-1) installed in a place close to a place where a request for processing is generated executes the processing in optimization or matching to be performed by the management apparatus 300, and in this case, exchanges data with other computers 1000-2 to 1000-4 to perform cooperation processing as necessary. Accordingly, it is possible to distribute processing loads to a plurality of computers.

In addition, in the sixth embodiment, the management apparatus 300 manages, for example, usage records and prepaid amounts or processing of paying a price to be paid to each user. The management apparatus 300 uses a block chain network in management of information related to prices.

Figure 11:
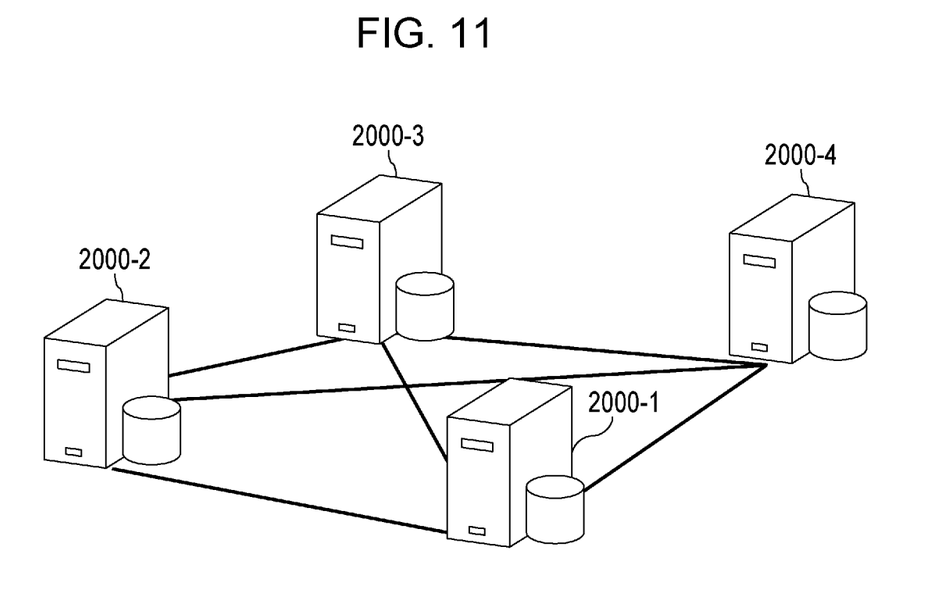
FIG. 11 is a diagram illustrating an example of a block chain network.

FIG. 11 is a diagram illustrating an example of a block chain network. The block chain network includes computers 2000-1 to 2000-4. The computers 2000-1 to 2000-4 may be CPUs or virtualized computers, for example. Further, the computers 2000-1 to 2000-4 may be databases, for example. The computers 2000-1 to 2000-4 store, for example, the same information such as usage records and prepaid amounts. Since the computers 2000-1 to 2000-4 store the same information, even when one computer 2000 malfunctions, it is possible to prevent loss of information because other computers 2000 stores the information. In addition, it is possible to enhance resistance to falsification according to characteristics of the block chain technology for including parts of past information in new information and storing the same.

Meanwhile, in the distributed network described in FIG. 10, for example, the configuration illustrated in FIG. 11 may be used. In this case, the computers 1000-1 to 1000-4 respectively correspond to the computers 2000-1 to 2000-4.

One disclosure can collectively control radio resources in a communication system in which a plurality of owners provide radio resources.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10 Wireless communication system
100 Terminal device
1000 Computer
200 Base station device
2000 Computer
201 RAN
210 CPU
220 Storage
230 Memory
240 NIC
300 Management apparatus
320 Storage
321 Price determination program
322 Radio resource control program
3221 Optimization module
3222 Matching module
323 Radio resource information
324 Radio control parameter
325 Radio resource allocation information
330 Memory
340 NIC
400 Core network

The invention claimed is:

1. A radio resource management method in a management apparatus for managing a wireless network including radio resources provided by owners, the radio resource management method comprising:
managing radio resource information about the radio resources;
acquiring, from a terminal device which uses the radio resources for communication, communication conditions representing conditions in the communication;
controlling the radio resources used by the terminal device for communication based on the radio resource information and the communication conditions;
acquiring amounts of usage of the radio resources from base stations;
determining prices to be paid to owners of the radio resources depending on the acquired amounts of usage of the radio resources;
acquiring investment ratios of a plurality of joint investors;
determining prices obtained by multiplying an amount of usage of a first radio resource by the investment ratios of the plurality of joint investors as prices for the plurality of joint investors;
storing reception of a usage fee of the radio resources from the owner of the terminal device before the terminal device uses the radio resources; and
permitting the terminal device to use the radio resources within a range of an amount of usage of the radio resources depending on the received usage fee;
wherein the first radio resource is a radio resource in which the plurality of joint investors jointly invest, and
wherein the first radio resource is a frequency band permitted to be used depending on an investment.

2. The radio resource management method according to claim 1, wherein the radio resource information includes information about communication performance of the radio resources.

3. The radio resource management method according to claim 2,
wherein the radio resources include a base station device wirelessly connected to the terminal device, and
wherein the information about communication performance of the radio resources includes at least one of a range of a transmission output transmittable by the base station device and a transmittable frequency band.

4. The radio resource management method according to claim 2,
wherein the radio resource information includes communication states of the radio resources,
the method further comprising acquiring the communication states of the radio resources from the radio resources.

5. The radio resource management method according to claim 4,
wherein the communication states include interference degrees of signals transmitted and received by the radio resources.

6. The radio resource management method according to claim 4, wherein the controlling includes allocating a radio resource which satisfies the communication conditions to the terminal device on a basis of the information about the communication performance of the radio resources and the communication states of the radio resources.

7. The radio resource management method according to claim 1, wherein the radio resources provided by the owners include a radio resource lent by the owners to the manager of the management apparatus.

8. The radio resource management method according to claim 1, wherein the radio resources information include information about a service provided to the terminal device.

9. The radio resource management method according to claim 1, wherein the radio resources information include service information about services provided to other radio resources.

10. The radio resource management method according to claim 9, wherein the services information includes at least one of information about provision of installation places for other radio resources, information about maintenance of the radio resources, and information about power supply to the radio resources.

11. The radio resource management method according to claim 1, further comprising:
   giving permission to use the radio resources to a core network; and
   determining a price to be paid by an owner of the core network to a manager of the management apparatus depending on the amount of usage of the radio resources used by the core network.

12. A wireless communication system comprising:
   a wireless network including radio resources provided by owners;
   a terminal device that performs communication using the radio resources; and
   a management apparatus that manages radio resource information about the radio resources, acquires, from the terminal device, communication conditions representing conditions in the communication, controls the radio resources used by the terminal device for communication on a basis of the radio resource information and the communication conditions, acquires amounts of usage of the radio resources from base stations, determines prices to be paid to owners of the radio resources depending on the acquired amounts of usage of the radio resources, acquires investment ratios of a plurality of joint investors, determines prices obtained by multiplying an amount of usage of a first radio resource by the investment ratios of the plurality of joint investors as prices for the plurality of joint investors, stores reception of a usage fee of the radio resources from the owner of the terminal device before the terminal device uses the radio resources; and permits the terminal device to use the radio resources within a range of an amount of usage of the radio resources depending on the received usage fee,
   wherein the first radio resource is a radio resource in which the plurality of joint investors jointly invest, and
   wherein the first radio resource is a frequency band permitted to be used depending on an investment.

13. The wireless communication system according to claim 12, further comprising:
   gives permission to use the radio resources to a core network, and
   determines a price to be paid by an owner of the core network to a manager of the management apparatus depending on the amount of usage of the radio resources used by the core network.

* * * * *